United States Patent Office

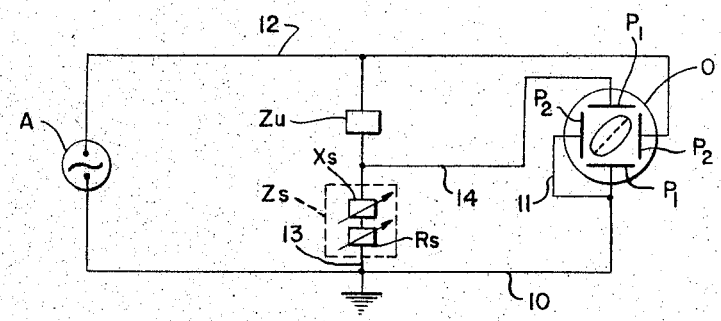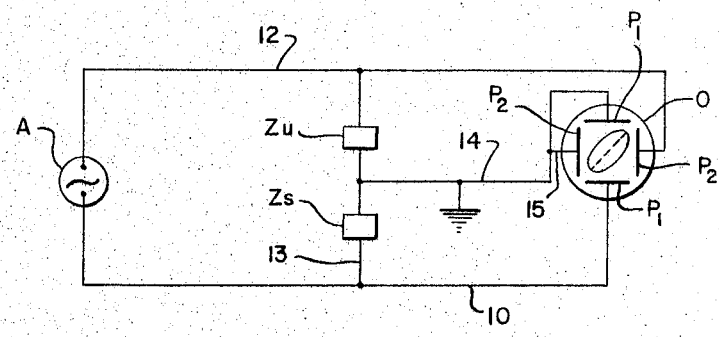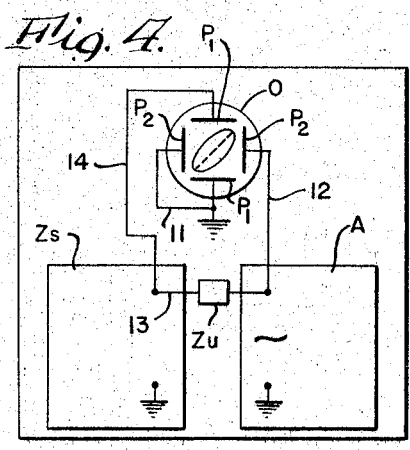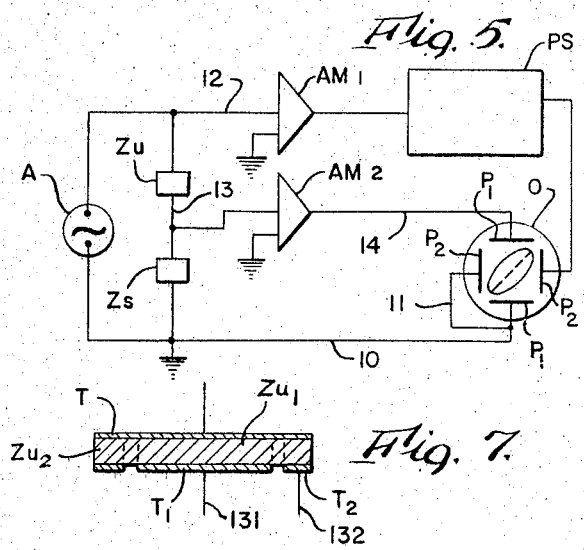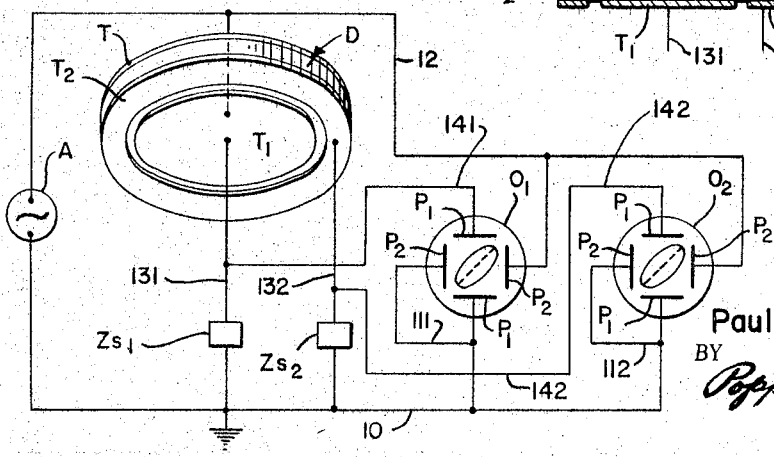

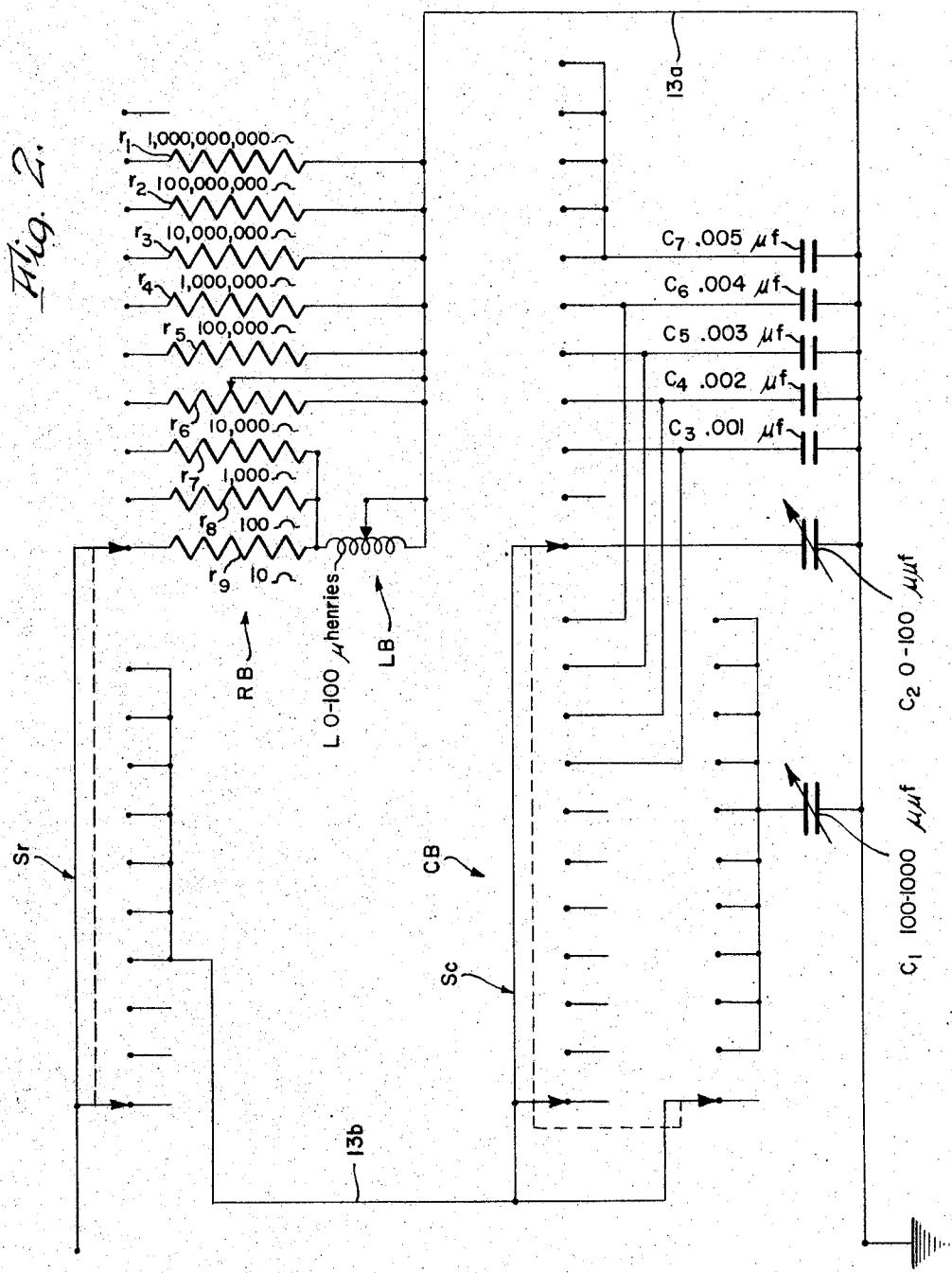

3,299,352
Patented Jan. 17, 1967

3,299,352
METHOD AND APPARATUS FOR MEASURING AN UNKNOWN IMPEDANCE BY COMPARISON WITH A STANDARD IMPEDANCE
Paul E. Carroll, 486 Cornwall Ave., Tonawanda, N.Y. 14150
Filed Aug. 12, 1963, Ser. No. 301,308
9 Claims. (Cl. 324—57)

This invention relates to impedance measurement, and more particularly to a new and improved method and apparatus for measuring an unknown impedance by comparison with a standard impedance.

Present impedance measuring instruments and techniques are limited in the range of frequency, impedance, voltage and/or current which can be used. Many are limited to the measurement of low loss impedances which can easily resonate, and very few can be used to measure non-linear high loss impedances in the semiconductor range.

Accordingly, it is a primary object of the present invention to provide an impedance measuring method and apparatus which do not suffer from the aforesaid limitations, but which are capable of determining impedances over a wide range of voltage, current, frequency and impedance levels, which are especially useful for measuring the usually high loss, non-linear impedance of semiconductor components, and which are also useful for determining apparent conductivity and dielectric permittivity of silicon carbide grain, as well as A.C. resistivity of silicon carbide crystals.

Another object is to provide an impedance measuring method which is readily adapted for commercial use as well as for use in the teaching of A.C. circuit theory, because it is based upon a visual comparison of an unknown impedance with a standard impedance and adjustment of the latter for readily determining the resistance and reactance of the unknown impedance.

Another object is to provide an impedance measuring apparatus which is also readily adapted for commercial use as well as for use in the teaching of A.C. circuit theory, because it incorporates simple circuitry, and an oscilloscope which produces a clear and accurate visual representation of the phase shift introduced by a particular unknown impedance, phase equality between the known and unknown impedances, and the deviation from linearity of the unknown impedance.

Another object is to provide an impedance measuring apparatus which employs a minimum number of simple components and hence is considerably less expensive to manufacture than presently available instruments for measuring impedances; which apparatus can be used over a wider range of frequencies than any such presently available instrument, e.g. from less than one cycle per second to more than one megacycle per second; which apparatus is capable of measuring impedances with high loss as easily as those with low loss; which apparatus can be used over a wide range of voltage whenever necessary to simulate operating conditions on a practical impedance, and which apparatus can be used to perform not only a two terminal impedance measurement of a dielectric but also the more accurate three terminal measurement with two oscilloscopes or a two gun oscilloscope under varying ambient conditions such as high temperature or high humidity.

Other objects and advantages of the invention will become apparent upon consideration of the following detailed description and accompanying drawings wherein like numerals and letters indicate like parts and wherein:

FIG. 1 is a schematic circuit diagram of a preferred embodiment of the inventive apparatus;

FIG. 2 is an enlarged schematic circuit diagram of a preferred form of adjustable standard or known impedance employed in the embodiment of FIG. 1 and in the remaining embodiments;

FIG. 3 is a schematic circuit diagram of a modification of the inventive apparatus in which the circuitry varies from that shown in FIG. 1 as to the connections to the oscilloscope;

FIG. 4 is a schematic circuit diagram of another modification thereof wherein the circuitry is the same as that shown in FIG. 1, but plug in units are employed for the alternating current source and the standard impedance;

FIG. 5 is a schematic circuit diagram of a further modification thereof wherein the circuitry shown in FIG. 1 is modified by the addition of amplifiers and a phase shifter;

FIG. 6 is a schematic wiring diagram of still another modification thereof for three terminal impedance measurement, with the dielectric, its upper common terminal and lower guarded and guard terminals being illustrated in bottom perspective, and the circuitry shown in FIG. 1 being duplicated for both the guard and guarded terminals, and FIG. 7 is a vertical sectional view through the dielectric and terminals of FIG. 6.

Referring now to the drawings, the inventive method and apparatus will be briefly described in general terms. Each of the embodiments of the apparatus illustrated is designed to measure an unknown impedance with an oscilloscope at frequencies ranging from less than one cycle per second to more than one megacycle per second. However, while the inventive method is preferably performed with an oscilloscope, it is not necessarily restricted thereto, as the use of other appropriate instruments such as voltmeters and phase meters in place of an oscilloscope are contemplated.

As noted above, the inventive method is based upon a visual comparison of an unknown impedance with a standard impedance and adjustment of the resistance and/or reactance of the standard impedance until the phases of the voltages on the unknown and standard impedances are equal. When equal phase is accomplished, the resistance and reactance of the unknown impedance can readily be determined because the ratio of unknown to standard resistance ($Ru/Rs$) is the same as the ratio of unknown to standard reactance ($Xu/Xs$) and the ratio of voltage across the unknown to voltage across the standard impedance ($Vu/Vs$.) The phase and voltage, of course, may be measured directly by phasemeters and voltmeters, as noted above. Expressed mathematically, this relationship is:

(1) $$Ru/Rs = Xu/Xs = Vu/Vs$$

When an oscilloscope of the illustrated type is employed as the preferred measuring instrument, there is also a definite relationship between the voltages across the impedances and the voltages across the electrostatic beam deflector plates. The condition of equal phase is indicated by a linear trace on the scope, as shown in dotted lines (phase difference being indicated by the balloon or ellipse shown in solid lines), and the ratio of voltage $V_2$ across the horizontal plates $P_2$ to voltage $V_1$ across the vertical plates $P_1$ is indicated by the reciprocal slope of the linear trace. The value of these voltages can readily be picked off the horizontal and vertical grid (not shown) on the scope. Expressed mathematically, the horizontal to vertical plate voltage ratio is $V_2/V_1$.

For the basic preferred circuit employed in FIGS. 1, 4, 5 and 6, the interrelationship between the voltages across the impedances and the plate voltages is as follows. The ratio of unknown to known impedance voltage differs by unity from the ratio of horizontal to vertical plate voltage on the scope. Expressed mathematically, this interrelationship is:

(2)  $Ru/Rs = XuXs = Vu/Vs = V_2/V_1 - 1$ because the standard impedance $Zs$ is connected to the vertical deflector plates $P_1$ and to the grounded left horizontal deflector plate $P_2$, the unknown impedance $Zu$ being connected to the ungrounded upper vertical plate $P_1$ and the ungrounded right horizontal plate $P_2$. Thus, the voltage $V_2$ across the horizontal plates $P_2$ equals the voltage across both impedances $Zu$ and $Zs$ and the voltage across the vertical plates $P_1$ equals the voltage across the standard impedance $Zs$.

Expressed mathematically:

$$V_2 = Vu + Vs$$
$$V_1 = Vs$$
$$V_2/V_1 - 1 = (V_2 - V_1)/V_1$$
$$V_2/V_1 - 1 = (Vu + Vs - Vs)/Vs$$
$$V_2/V_1 - 1 = Vu/Cs$$

For the modified alternative circuit employed in FIG. 3, the interrelationship between the voltages across the impedances and the plate voltages is as follows. The ratio of unknown to known impedance is equal to the ratio of horizontal to vertical voltage on the scope. Expressed mathematically, this interrelationship is:

(3)  $Ru/Rs = Xu/Xs = Vu/Vs = V_2/V_1$ because the upper vertical plate $P_1$ is grounded instead of the lower vertical plate $P_1$, and while the standard impedance $Zs$ is still connected to the vertical plates $P_1$ and to the grounded left horizontal plate $P_2$, the unknown impedance $Zu$ is also connected to the grounded left horizontal plate $P_2$. Thus, the voltage $V_2$ across the horizontal plates $P_2$ equals the voltage $Vu$ across the unknown impedance $Zu$, while the voltage $V_1$ across the vertical plates $P_1$ equals the voltage across the standard impedance.

Expressed mathematically:

$$V_2 = Vu$$
$$V_1 = Vs$$
$$V_2/V_1 = Vu/Vs$$

Since the ratio of unknown to standard resistance and the ratio of unknown to standard reactance are the same as the ratio of voltages across the unknown to standard impedance from Equation 1, it is then but a simple matter to determine the resistance and reactance of the unknown impedance from either Equation 2 when employing the circuitry of FIGS. 1, 4, 5 and 6 or Equation 3 when employing the circuitry of FIG. 3.

Referring to FIG. 1, the preferred embodiment includes a suitable A.C. voltage source such as an alternator or oscillator A, an oscilloscope O having two pairs of electrostatic beam deflector plates, one plate of each pair being grounded, the horizontal beam deflecting plates being designated at $P_2$ and the vertical beam deflecting plates being designated at $P_1$. The unknown impedance is designated as $Zu$ and the adjustable standard impedance as $Zs$. A first circuit line 10 connects one side of alternator A to the grounded lower vertical deflector plate $P_1$ and by branch 11 to the left grounded horizontal deflector plate $P_2$. A second circuit line 12 connects the other side of alternator A to the right ungrounded plate $P_2$. A third circuit line 13 connects the impedances $Zu$ and $Zs$ in series with each other across lines 10 and 12, while a fourth circuit 14 line connects line 13 at the juncture between impedances $Zu$ and $s$ to the upper ungrounded vertical plate $P_1$, the circuitry being grounded at the juncture of lines 10 and 13.

The preferred form of adjustable standard impedance $Zs$ used in all of the embodiments is illustrated in FIG. 2. Impedances $Zs$ includes independently adjustable resistance, inductance and capacitance branches generally indicated at RB, LB and CB respectively.

The capacitance branch CB includes a multi-position (12 steps) gang switch $Sc$ for varying the value of the capacitance branch CB from nearly zero to .01 microfarad by selective connections to any one of seven parallel capacitances $C_1 \ldots C_7$, having the indicated values, $C_1$ and $C_2$ being independently variable. The inductance branch LB is composed of a single inductance L which is variable over the indicated range of zero to 100 microhenries.

The resistance branch RB includes a multi-position (10 steps) gang switch $Sr$ for varying the value of this branch from 10 ohms to 1000 megohms by selective connections to any one of nine parallel resistances $r_1 \ldots r_9$ having the indicated values, $r_6$ being variable. The last or tenth (right hand) step on the switch gives the open circuit resistance, while the first three steps (left hand) disconnect the capacitance branch CB and connect the inductance branch LB in series with the resistance branch RB through resistances $r_7$, $r_8$ or $r_9$, and the next six steps connect capacitance branch CB in parallel through circuit lines 13a, 13b while disconnecting inductance branch LB.

As will be evident, this preferred embodiment of the standard impedance $Zs$ can readily be adjusted over a wide range of impedance for creating the optimum condition wherein the phase of the voltage across $Zu$ and $Zs$ is equal to the phase of the voltage across $Zu$.

In practicing the inventive method when employing the circuitry of FIGS. 1 and 2, a comparison of the phase of the horizontal plate voltage to that of the vertical plate voltage is facilitated by the "balloon" or ellipse visually presented on the scope. The required adjustment of the value of the standard impedance may readily be accomplished to produce the linear trace, whereupon the horizontal and vertical plate voltages may be readily compared for determination of the resistance and reactance of the unknown impedance from Equation 2 above.

Referring to FIG. 3, an alternative circuitry embodiment is illustrated wherein the determination of the unknown impedance $Zu$ is made from Equation 3 above. In this embodiment line 14 is grounded and is provided with a ground branch 15, and the horizontal plate voltage is equal to the voltage across $Zu$ instead of $Zu$ and $Zs$.

As compared to FIG. 1, the circuitry of FIG. 3 suffers from the disadvantage that the effect of any stray impedance between the right horizontal plate $P_2$ and ground must be taken into account when computing the values of $Ru$ and $Xu$. In general, this will be a more difficult calculation than for the preferred form of FIG. 1. However, when the unknown impedance is very small by comparison with the stray impedances, this form will be useful. Also, with this form, it is a practical necessity to use an oscillator with both output terminals effectively isolated from instrument ground.

The alternative embodiment of FIG. 4 uses the circuitry of FIG. 1, but employs an oscilloscope with separate plug-in units for the horizontal and vertical deflection systems for increased versatility of the scope. Thus, the standard impedance $Zs$ is supplied as the plug-in unit for the vertical axis of the scope, while the oscillator A is supplied as the horizontal plug-in unit.

The alternative embodiment of FIG. 5 uses the circuitry of FIG. 1, but adds amplifiers $AM_1$ and $AM_2$ to the horizontal and vertical deflection systems respectively. Then one can work with voltages that are either higher or lower than that required for the basic deflection system. In this case one must have a phase adjustment to compensate for any phase change introduced by differences in the two amplifiers. It is best to put the phase adjuster PS in the horizontal deflection system as shown.

While it is usually unnecessary to use any phase adjustment when employing the basic circuitry of FIG. 1, the oscilloscope O must be checked before use because some oscilloscopes may have imperfections which introduce a phase difference at high frequencies.

While the use of amplifiers $AM_1$ and $AM_2$ in FIG. 5 does increase the cost of the apparatus, it also increases its versatility. This allows for measurement of the unknown impedance $Zu$ under simulated conditions of operation, and measurements with very high or very low wattage supplied to the unknown impedance are then possible. A shortcoming of many presently available instruments is that they do not simulate operating conditions for the unknown impedance.

Referring now to FIGS. 6 and 7, these illustrate a modified embodiment wherein three terminal measurements of a dielectric D can be performed with two oscilloscopes $O_1$, $O_2$ or a two gun oscilloscope (the two scopes being illustrated for clarity), as contrasted with the two terminal measurements made with the previous embodiments. The circuitry is basically the same as for FIG. 1, except that it is duplicated for the second scope, and two standard impedances, $Zs_1$, $Zs_2$ and two unknown impedances $Zu_1$, $Zu_2$ are employed.

The principal unknown impedance to be determined is the impedance $Zu_1$ of that portion of the dielectric D (such as an insulator in the form of a circular disc formed of alumina) arranged between a common terminal T (shown in the form of a large circular plate completely covering the upper side of disc D) and a guarded terminal $T_1$ (shown in the form of a smaller circular plate partially covering the bottom side of disc D). The other unknown impedance which may be determined is the impedance $Zu_2$ of that portion of disc D arranged between common terminal T and an annular guard terminal $T_2$ concentrically spaced around $T_1$.

The purpose of the three terminal measurement is to obtain accurate measurements under varying ambient conditions such as high temperature or high humidtiy, as recommended by the American Society for Testing Materials. Current through the dielectric D from common terminal T is allowed to flow to guarded terminal $T_1$ and through the principal measuring circuit described below. The guard terminal $T_2$ is placed at the same voltage as the guarded terminal $T_1$ so that the dielectric D will have a uniform field across it. Thus, any current flow due to surface leakage or through the portion under guard electrode $T_2$ does not flow through the principal measuring circuit, but only through the subsidiary measuring circuit.

Continuing with FIG. 6, it will be noted that first and second circuit lines are the same as for FIG. 1, except that they are extended to the corresponding pairs of plates of the second scope $O_2$ (or second gun) in the same manner as for scope $O_1$ (or first gun). The first impedances $Zu_1$ and $Zs_1$ are connected in series with each other at the guarded terminal $T_1$ and across lines 10 and 12 through common terminal T by third circuit line 131, while the second impedances $Zu_2$ and $Zs_2$ are connected in series with each other at guard terminal $T_2$ and across lines 10 and 12 through the common terminal by fourth circuit line 132 having a common lead with line 131 from T to line 12. Fifth circuit line 141 connects line 131 between $Zu_1$ and $Zs_1$ to ungrounded upper vertical plate $P_1$ of scope (or gun) $O_1$ in the same manner as in FIG. 1, as does sixth circuit line 142 connect line 132 between $Zu_2$ and $Zs_2$ to ungrounded upper vertical plate $P_1$ of scope (or gun) $O_2$. Likewise, the left horizontal plate $P_2$ and lower vertical plate $P_1$ of scopes (or guns) $O_1$, $O_2$ are grounded by branches 111 and 112 respectively.

The method employed for measuring $Zu_1$ is exactly the same as for that used in FIG. 1, except that the steps of comparing voltage phase, adjusting impedance and comparing voltages are repeated for impedances $Zu_2$ and $Zs_2$ until the phase and value of the voltage across $Zs_2$ are equal to the phase and value of the voltage across $Zs_1$ (or phase and value of voltage across $Zu_2$ equals phase and value of voltage across $Zu_1$). This is indicated by identity of slope of the linear trace on scope (or gun) $O_2$ with the slope of the linear trace on scope (or gun) $O_1$.

The value of $Zu_1$ or $Zu_2$ is then readily determinable from Equation 2 above.

It will now be seen how the invention accomplishes its various objects, and the numerous advantages of the invention will also be evident. While the invention has been described with reference to certain illustrated embodiments, it is to be understood that the inventive method is not necessarily restricted to the use of an oscilloscope, that various changes may be made in the invention by those skilled in the art without departing from the inventive concept, and that the scope of the invention is to be determined by the appended claims.

What is claimed is:

1. A method for measuring the resistance and reactance of an unknown impedance by comparison with a standard impedance connected in series therewith and including resistance and reactance, and which method comprises: applying an A.C. voltage across said impedances, comparing the phase of the voltage across at least one of said impedances with the phase of the voltage across the other of said impedances, adjusting the resistance and/or reactance of said standard impedance until said phases are equal, comparing the value of the voltage across at least one of said impedances with the value of the voltage across the other of said impedances and determining the resistance and reactance of said unknown impedance from the relationship $Ru/Rs = Xu/Xs = Vu/Vs$, where $Vu$, $Ru$ and $Xu$ are respectively the voltage across and the resistance and reactance of said unknown impedance, and $Vs$, $Rs$ and $Xs$ are respectively the voltage across and the resistance and reactance of said standard impedance.

2. A method for measuring the resistance and reactance of an unknown impedance by comparison with a standard impedance connected in series therewith and including resistance and reactance, and which method comprises: applying an A.C. voltage across said impedances, comparing the phase of the voltage across both of said impedances with the phase of the voltage across said standard impedance, adjusting the resistance and/or reactance of said standard impedance until said phases are equal, comparing the value of the voltage across both of said impedances with the value of the voltage across said standard impedance, and determining the resistance and reactance of said unknown impedance from the relationship $Ru/Rs = Xu/Xs = VuVs$, where $Vu$, $Ru$ and $Xu$ are respectively the voltage across and the resistance and reactance of said unknown impedance, and $Vs$, $Rs$ and $Xs$ are respectively the voltage across and the resistance and reactance of said standard impedance.

3. A method for measuring the resistance and reactance of a first unknown impedance of a portion of a dielectric arranged between a common terminal and a guarded terminal by comparison with a first standard impedance connected in series with said first unknown impedance at said guarded terminal, and for measuring the resistance and reactance of a second unknown impedance of another portion of said dielectric arranged between said common terminal and a guard terminal spaced from said guarded terminal by comparison with a second standard impedance connected in series with said second unknown impedance at said guard terminal, each of said standard impedances including resistance and reactance, and which method comprises: applying an A.C. voltage across said impedances, comparing the phase of the voltage across both of said first impedances with the phase of the voltage across said first standard impedance, adjusting the resistance and/or reactance of said first standard impedance until said phases are equal, comparing the value of the voltage across both of said first impedances with the value of the voltage across said first standard impedance, and repeating the aforesaid steps of comparing voltage phase, adjusting resistance and reactance and comparing voltage value for said second impedances until the phase and voltage across said second standard impedance are equal to the phase and voltage across said first standard impedance, and determining the value of said first or second unknown impedance from the relationship $Ru/Rs=Xu Xs=Vu/Vs$, where $Vu$, $Ru$ and $Xu$ are respectively the voltage across and the resistance and reactance of said first or second unknown impedance, and $Vs$, $Rs$ and $Xs$ are respectively the voltage across and the resistance and reactance of said first or second standard impedance.

4. A method for measuring the resistance and reactance of an unknown impedance connected to a deflector of each of two pairs of electrostatic beam deflectors of an oscilloscope, one deflector of each of said pairs being grounded, by comparison with a standard impedance connected in series with said unknown impedance, and to the deflectors of one of said pairs and to the grounded deflector of the other of said pairs, said oscilloscope being adapted to indicate the phase and value of the voltage across each of said pairs, said standard impedance including resistance and reactance, and which method comprises: applying an A.C. voltage across said impedances and oscilloscope, comparing the phase of the voltage across said one of said pairs with the phase of the voltage across said other of said pairs, adjusting the resistance and/or reactance of said standard impedance until said phases are equal, comparing the value of the voltage across said one of said pairs with the value of the voltage across said other of said pairs and determining the resistance and reactance of said unknown impedance from the relationship $Ru/Rs=Xu/Xs=V_2/V_1$ or $V_2/V_1-1$, where $Ru$ and $Xu$ are respectively the resistance and reactance of said unknown impedance, $Rs$ and $Xs$ are respectively the resistance and reactance of said standard impedance, $V_2$ is the voltage across said other of said pairs, and $V_1$ is the voltage across said one of said pairs.

5. The method of claim 4, wherein said unknown impedance is connected only to the ungrounded deflectors of said pairs, said resistance and reactance of said standard impedances are in the form of independently adjustable resistance, inductance and capacitance branches, the necessary ones of which are adjusted until said phases are equal, and including determining the resistance and reactance of said unknown impedance from the relationship $Ru/Rs=Xu/Xs=V_2/V_1-1$, where $Ru$ and $Xu$ are respectively the resistance and reactance of said unknown impedance, $Rs$ and $Xs$ are respectively the resistance and reactance of said standard impedance, $V_2$ is the voltage across said other of said pairs, and $V_1$ is the voltage across said one of said pairs.

6. A method for measuring the resistance and reactance of a first unknown impedance of a portion of a dielectric arranged between a common terminal and a guarded terminal by comparison with a first standard impedance connected in series with said first unknown impedance at said guarded terminal, said first unknown impedance being connected to the ungrounded deflectors of two first pairs of electrostatic beam deflectors of an oscilloscope, one deflector of each of said first pairs being grounded, said first standard impedance being connected to the deflectors of one of said first pairs and to the grounded deflector of the other of said first pairs, and for measuring the resistance and reactance of a second unknown impedance of another portion of said dielectric arranged between said common terminal and a guard terminal spaced from said guarded terminal by comparison with a second standard impedance connected in series with said second unknown impedance at said guard terminal, said second unknown impedance being connected to the corresponding ungrounded deflectors of two second pairs of electrostatic beam deflectors corresponding to said two first pairs, one corresponding deflector of each of said second pairs being grounded, said second standard impedance being connected to the deflectors of the corresponding one of said second pairs and to the corresponding grounded deflector of the other of said second pairs, said oscilloscope being adapted to illustrate the phase and value of the voltage across each of said first and second pairs respectively, each of said standard impedances including resistance and reactance in the form of independently adjustable resistance, inductance and capacitance branches, and which method comprises: applying an A.C. voltage across said impedances said first and second pairs, comprising the phase of the voltage across said other of said first pairs with the phase of the voltage across said one of said first pairs, adjusting the necessary ones of said branches of said first standard impedance until said phases are equal, comprising the value of the voltage across said other of said first pairs with the value of the voltage across said one of said first pairs, repeating the aforesaid steps of comparing voltage, comparing phase, adjusting branches and comparing voltage value for said second impedances until the phase and value of the voltage across said one of said second pairs or said other of said second pairs are equal to the phase and value of the voltage across said one of said first pairs or said other of said first pairs respectively, and determining the value of said first or second unknown impedance from the relationship $$Ru/Rs=Xu/Xs=V_2/V_1-1$$

where $Ru$ and $Xu$ are respectively the resistance and reactance of said first or second unknown impedance, $Rs$ and $Xs$ are respectively the resistance and reactance of said first or second standard impedance, $V_2$ is the voltage across said other of said first or second pairs, and $V_1$ is the voltage across said one of said first or second pairs.

7. Apparatus for measuring the resistance and reactance of an unknown impedance by comparison with a standard impedance, and which apparatus comprises: an A.C. voltage source, an oscilloscope having two pairs of electrostatic beam deflectors, one deflector of each of said pairs being grounded, first circuit means connecting one side of said source to the ungrounded deflector of one of said pairs, second circuit means connecting the other side of said source to one deflector of the other of said pairs, an unknown impedance, an adjustable standard impedance including resistance and reactance, third circuit means connectaing said impedances in series with each other across said first and second circuit means, and fourth circuit means connecting said third circuit means between said impedances to the other deflector of the other of said pairs, said oscilloscope being adapted to indicate the phase and value of the voltage across each of said pairs, and said resistance and/or reactance of said standard impedance being adjustable until said phases are equal.

8. Apparatus for measuring the resistance and reactance of an unknown impedance by comparison with a standard impedance, and which apparatus comprises: an A.C. voltage source, an oscilloscope having two pairs of electrostatic beam deflectors, one deflector of each of said pairs being grounded, first circuit means connecting one side of said source to the ungrounded deflector of one of said pairs, second circuit means connecting the other side of said source to the grounded deflectors of each of said pairs, an unknown impedance, an adjustable standard impedance, including resistance and reactance in the form of independently adjustable resistance, inductance and capacitance branches, third circuit means connecting impedances in series with each other across said first and second circuit means, and fourth circuit means connecting said third circuit means between said impedances to the ungrounded deflector of the other of said pairs, said oscilloscope being adapted to indicate the phase and value of the voltage across each of said pairs, and the necessary ones of said branches of said standard impedance being adjustable until said phases are equal.

9. Apparatus for measuring the resistance and reactance of a first unknown impedance of one portion of a dielectric arranged between a common terminal and a guarded terminal by comparison with an adjustable first standard impedance, and for measuring the resistance and reactance of a second unknown impedance of another portion of said dielectric arranged between said common terminal and a guard terminal by comparison with an adjustable second standard impedance, and which apparatus comprises: an A.C. voltage source, at least one oscilloscope having two first pairs and two second pairs of electrostatic beam deflectors corresponding to said first pairs, one deflector of each of said pairs being grounded, first circuit means connecting one side of said source to the ungrounded deflector of one of said first pairs and to the corresponding ungrounded deflector of the corresponding one of said second pairs, second circuit means connecting the other side of said source to the grounded deflectors of said first pairs and to the corresponding grounded deflectors of said second pairs, said first and second unknown impedances, said first and second standard impedances each including resistance and reactance in the form of independently adjustable resistance, inductance and capacitance branches, third circuit means connecting said first impedances in series with each other at said guarded terminal and across said first and second circuit means, fourth circuit means connecting said second impedances in series with each other at said guard terminal and across said first and second circuit means, fifth circuit means connecting said third circuit means between said first impedances to the ungrounded deflector of the other of said first pairs, and sixth circuit means connecting said fourth circuit means between said second impedances to the corresponding ungrounded deflector of the other of said second pairs, said oscilloscope being adapted to indicate the phase and value of the voltage across each of said first and second pairs respectively, and the necessary ones of said branches of said first and second standard impedances being adjustable until the phase and value of the voltage across said one of said second pairs or said other of said second pairs are equal to the phase and value of the voltage across said one of said first pairs or said other of said first pairs respectively.

References Cited by the Examiner

UNITED STATES PATENTS

| | | | |
|---|---|---|---|
| 2,162,009 | 6/1939 | Goldsmith | 324—121 X |
| 2,409,419 | 10/1946 | Christaldi | 324—57 |
| 2,434,914 | 1/1948 | Earp | 324—82 |
| 2,457,136 | 12/1948 | Earp | 324—88 X |
| 2,566,699 | 9/1951 | Frommer | 324—121 X |
| 2,648,979 | 8/1953 | Cornett | 324—88 X |
| 3,056,921 | 10/1962 | Flarity | 324—57 |
| 3,230,449 | 1/1966 | Kaiser | 324—57 X |

FOREIGN PATENTS 155,086   2/1954   Australia.

OTHER REFERENCES

Brailsford: Electronics, "Measuring Coil Characteristics Without an Impedance Bridge," May 1943, pages 86–88, 176 and 178.

Markey: Electronics, "Cathode-Ray Null Detector," March 1945, page 125.

RUDOLPH V. ROLINEC, *Primary Examiner.*

WALTER L. CARLSON, E. E. KUBASIEWICZ,
*Assistant Examiners.*